US008078315B2

(12) United States Patent
McKernan et al.

(10) Patent No.: US 8,078,315 B2
(45) Date of Patent: Dec. 13, 2011

(54) CONTROL SYSTEM FOR A LOAD HANDLING CLAMP

(75) Inventors: Pat S. McKernan, Portland, OR (US); Greg A. Nagle, Portland, OR (US)

(73) Assignee: Cascade Corporation, Portland, OR (US)

( * ) Notice: Subject to any disclaimer, the term of this patent is extended or adjusted under 35 U.S.C. 154(b) by 561 days.

(21) Appl. No.: 12/117,648

(22) Filed: May 8, 2008

(65) Prior Publication Data

US 2009/0281655 A1 Nov. 12, 2009

(51) Int. Cl.

| | |
|---|---|
| ***G06F 7/00*** | (2006.01) |
| ***G06F 7/70*** | (2006.01) |
| ***G05B 19/04*** | (2006.01) |
| ***G05B 19/18*** | (2006.01) |
| ***G05D 1/00*** | (2006.01) |

(52) U.S. Cl. .......... 700/228; 700/245; 700/250; 701/50; 701/1; 269/329

(58) Field of Classification Search ........................ None
See application file for complete search history.

(56) References Cited

U.S. PATENT DOCUMENTS

| | | | | |
|---|---|---|---|---|
| 4,423,998 A | | 1/1984 | Inaba et al. | |
| 4,714,399 A | | 12/1987 | Olson | |
| 4,726,729 A | | 2/1988 | Olson et al. | |
| 4,832,341 A | * | 5/1989 | Muller et al. | 463/17 |
| 5,330,168 A | * | 7/1994 | Enomoto et al. | 269/329 |
| 5,335,955 A | * | 8/1994 | Pekka et al. | 294/88 |
| 5,516,255 A | | 5/1996 | Tygard | |
| 5,604,715 A | | 2/1997 | Aman et al. | |

(Continued)

FOREIGN PATENT DOCUMENTS

DE 3801133 C2 3/1995

(Continued)

OTHER PUBLICATIONS

"UEX Appliance Clamp—VFC Volumetric Pressure Control," 2003, pp. 1-4, Cascade Corporation, Portland, Oregon.

(Continued)

*Primary Examiner* — Gene Crawford
*Assistant Examiner* — Yolanda Cumbess
(74) *Attorney, Agent, or Firm* — Chernoff, Vilhauer, McClung & Stenzel, LLP

(57) ABSTRACT

A control system for a load-handling clamp includes first and second load-engaging surfaces for selectively gripping and releasing a load disposed between said surfaces. At least one of said surfaces is selectively movable toward the other by a hydraulic actuator. At least one fluid valve assembly variably regulates a maximum hydraulic clamping pressure capable of causing the actuator to move one of the surfaces toward the other in a load clamping movement. Preferably, a load geometry sensor produces an electrical effect that varies as a function of the geometric profile of the load. A data receiver preferably also obtains load identification information related to at least one characteristic of the load, other than the load's geometry. A controller, in response to the data receiver and load geometry sensor, operates to control the valve assembly's regulation of the maximum hydraulic clamping pressure. In order to prepare for the load clamping movement, the controller is preferably also capable of enabling the actuator to move one of said surfaces toward the other in an initial clamp closing movement at a maximum hydraulic closing pressure greater than the maximum hydraulic clamping pressure. Thereafter the controller enables the load clamping movement at a pressure level substantially no greater than the maximum hydraulic clamping pressure.

3 Claims, 9 Drawing Sheets

U.S. PATENT DOCUMENTS

| | | | |
|---|---|---|---|
| 5,706,408 A | 1/1998 | Pryor | |
| 5,984,617 A | 11/1999 | Seaberg | |
| 6,332,098 B2 | 12/2001 | Ross et al. | |
| 6,439,826 B1 | 8/2002 | Jordan et al. | |
| 7,121,457 B2 | 10/2006 | Michal, III | |
| 7,151,979 B2 | 12/2006 | Andersen et al. | |
| 2001/0039464 A1 | 11/2001 | Hackauf | |
| 2003/0233184 A1 * | 12/2003 | Roncari | 701/50 |
| 2004/0102870 A1 | 5/2004 | Andersen et al. | |
| 2006/0115354 A1 * | 6/2006 | Prentice et al. | 414/667 |

FOREIGN PATENT DOCUMENTS

| | | | |
|---|---|---|---|
| DE | 19964034 | A1 | 7/2001 |
| DE | 10005220 | C2 | 1/2002 |
| DE | 4433050 | B4 | 1/2004 |
| EP | 0995557 | A2 | 4/2000 |
| EP | 995557 | A2 * | 4/2000 |
| EP | 1371601 | A2 | 12/2003 |
| EP | 1371601 | A2 * | 12/2003 |
| WO | WO92/00913 | | 1/1992 |
| WO | WO2008/040853 | A1 | 4/2008 |

OTHER PUBLICATIONS

PCT International Search Report, International Application No. PCT/US2009/002127, pp. 1-4, Cascade Corporation, Portland, Oregon.

* cited by examiner

CONTROL SYSTEM FOR A LOAD HANDLING CLAMP

BACKGROUND OF THE INVENTION

The present invention relates to improvements in fluid power load-clamping systems with automatically variable maximum clamping force control, for optimizing the versatility and speed by which a wide variety of different load types in a warehouse or other storage facility can be properly clamped in a manner automatically adaptive to each load type and configuration.

Load handling clamps typically operate in a storage or shipping facility such as a warehouse or distribution center and must often be capable of handling more than one type, or variety, of load. The clamps in some of these facilities encounter a relatively small number of distinct load types. For example, a load handling clamp being used in a distribution center for a large consumer appliance manufacturer may encounter dishwashers, washing machines, clothes dryers and refrigerators almost exclusively. In other facilities, load handling clamps will encounter a much wider variety of load types. The appliances from the previous example may, for instance, be shipped to a warehouse for a large retail store. The warehouse may also contain computers, furniture, televisions, etc. A clamp may thus encounter cartons having similar outward appearances and dimensions but containing products having differing optimal maximum clamping force requirements due to different load characteristics such as weight, fragility, packaging, etc. A clamp may also not always be required to grip the same number of cartons. For instance a clamp may be utilized to simultaneously move four refrigerator cartons, then to move a single dishwasher carton, and finally a single additional refrigerator carton, presenting different load geometries also having differing optimal maximum clamping force requirements, separate from those arising from the foregoing load characteristics.

Fluid power clamping systems with automatically variable limitations on clamping force usually impose such limitations in a way which limits the speed with which the load-engaging surfaces can be closed into initial contact with the load, thereby limiting the productivity of the load-clamping system. This problem has been reduced in the past by allowing higher maximum fluid closing pressures than optimal maximum fluid pressure during initial closure and then, when the load is about to be contacted by the load-engaging surfaces, decreasing the maximum fluid pressure limit to a limit at or below the optimal limit to clamp the load. However this latter approach, although faster, has not previously been usable compatibly with complex inputs involving both load geometries and load characteristics as described above.

DETAILED DESCRIPTION OF AN EXEMPLARY EMBODIMENT

Figure 1A:
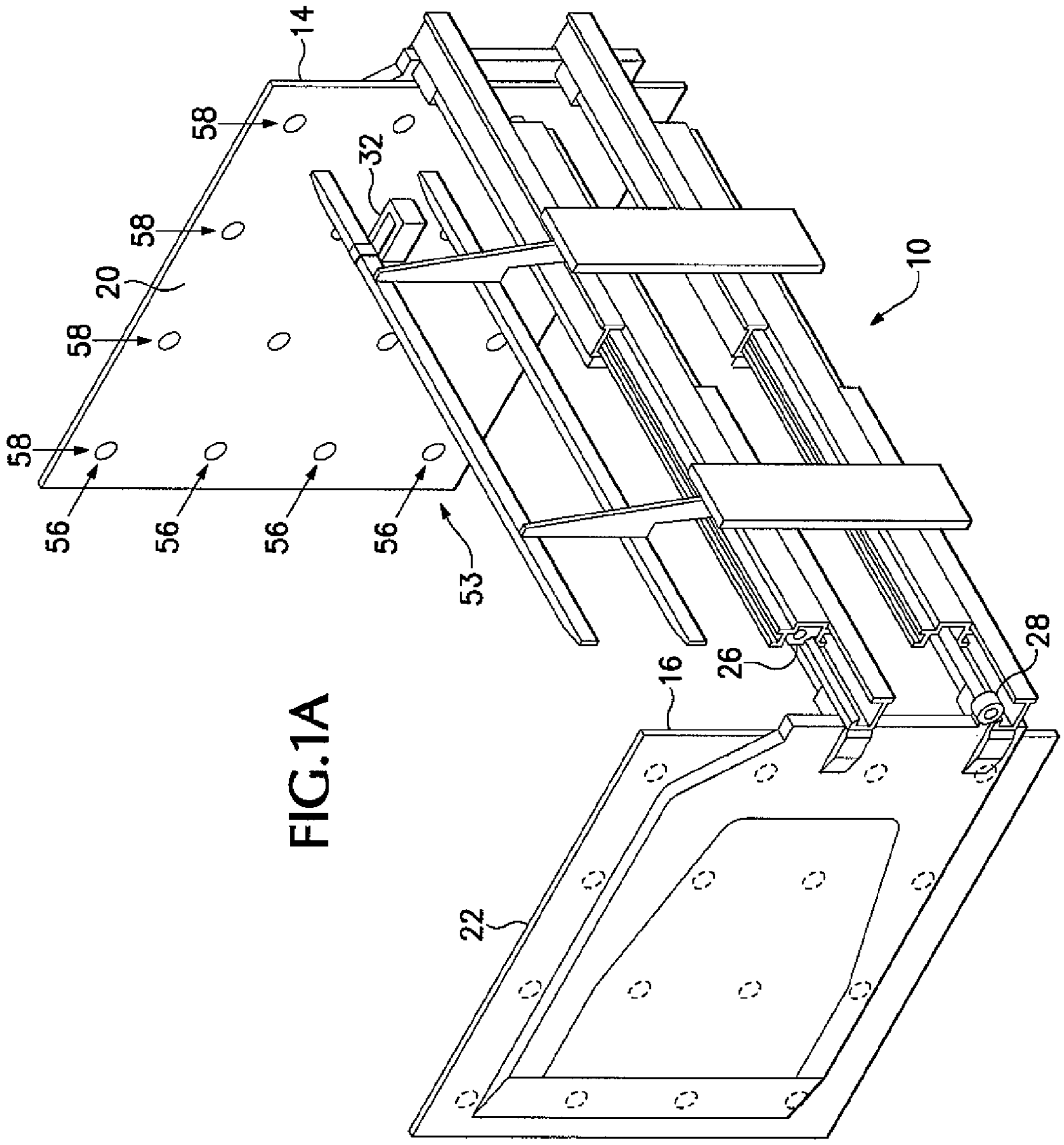
FIG. 1A is a perspective view of an exemplary embodiment of a load handling clamp including the present control system.
Figure 1B:
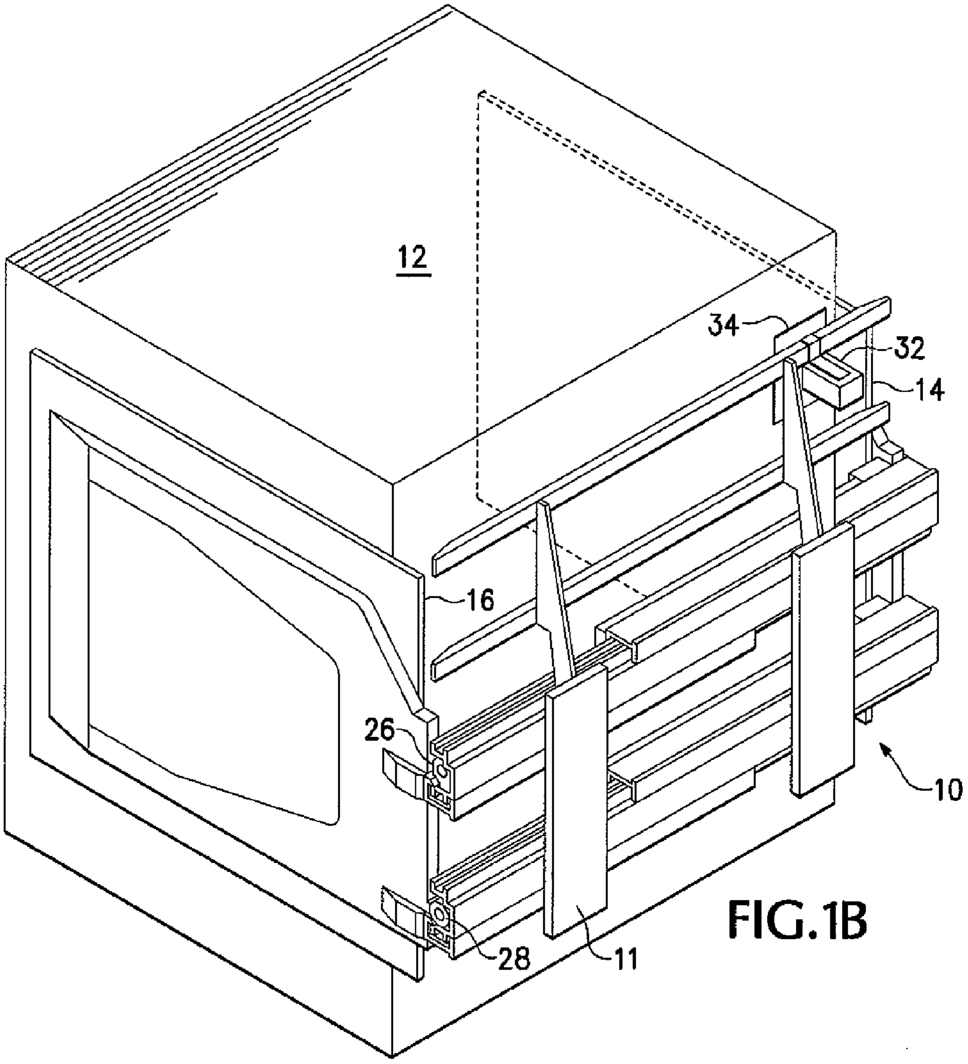
FIG. 1B illustrates the load handling clamp of FIG. 1A with a gripped load.

A load-handling clamp for use with an exemplary embodiment of the present automated clamping force control system is indicated generally as 10 in FIGS. 1A and 1B. The exemplary clamp 10 is a hydraulically-powered, slidable-arm clamp having a frame 11 adapted for mounting on a lift truck carriage which is selectively reciprocated linearly along a conventional tiltable upright hydraulically-powered load-lifting mast (not shown). The particular exemplary slidable-arm clamp 10 depicted in the drawings is for handling prismatic objects such as cartons or packages 12 in FIG. 1B, and could be of any suitable slidable arm design. Clamp arms 14, 16 are slidable selectively away from or toward one another perpendicular to the plane of load engaging surfaces 20, 22. Hydraulic cylinders 26, 28 selectively extend or retract respective clamp arms 20, 22. A carton such as 12 could be damaged if subjected to excessive over-clamping to prevent slippage. On the other hand, under-clamping can cause the carton 12 to slip from the frictional grasp of the clamp 10.

Although a hydraulically-operated carton clamp 10 is described herein as an exemplary embodiment, the load clamping system herein is also applicable to many other types of load clamps. For example, a hydraulically operated pivoted-arm paper roll clamp could be configured in accordance with the present load clamping system.

The exemplary embodiment of the present automatic clamping force control system may include a data receiver, such as an electronic code reader 32 disposed on the clamp 10. In cooperation with implementing the exemplary embodiment of the present system, items to be clamped may be advantageously tagged with coded labels 34. The coded label 34 should contain information sufficient to assist the present load clamping system in determining, as will be described hereafter, an appropriate maximum clamping force for the labeled item. The coded label 34 may, for example, communicate a digital data string containing the item's LOAD ID, or other direct of indirect characteristic-identifying indicia.

A load may be made up of one or more labeled items and therefore the appropriate clamping force for the individual labeled item may or may not be appropriate for the entire load. Embodiments of the present system utilize other techniques, as will be described hereafter, to make this determination.

The electronic code reader 32 is positioned to read the coded label 34 on at least one item making up a load presented to the load handling clamp 10. The electronic code reader may operate automatically, for example by searching for a coded label whenever the clamp arms are in an open position or whenever a load is detected between the clamp arms, as will be described in more detail below. Alternatively, the electronic code reader may be operated manually by the clamp operator. The coded label 34 and electronic code reader 32 may respectively be a bar code and bar code scanner, radio frequency identification (RFID) tag and RFID reader, or other machine readable label and corresponding reader combination. In the case of an RFID system, the clamp's RFID reader may be limited such that it only detects RFID tags disposed between the clamp arms 14, 16. The LOAD ID or other load indicia may alternatively be input by the clamp operator, for example where a coded label is rendered somehow unreadable or if an item is incorrectly labeled.

Figure 2A:
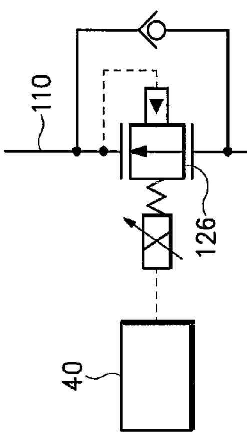
FIG. 2A is a partial alternative exemplary embodiment of the circuit shown in FIG. 2.
Figure 2:
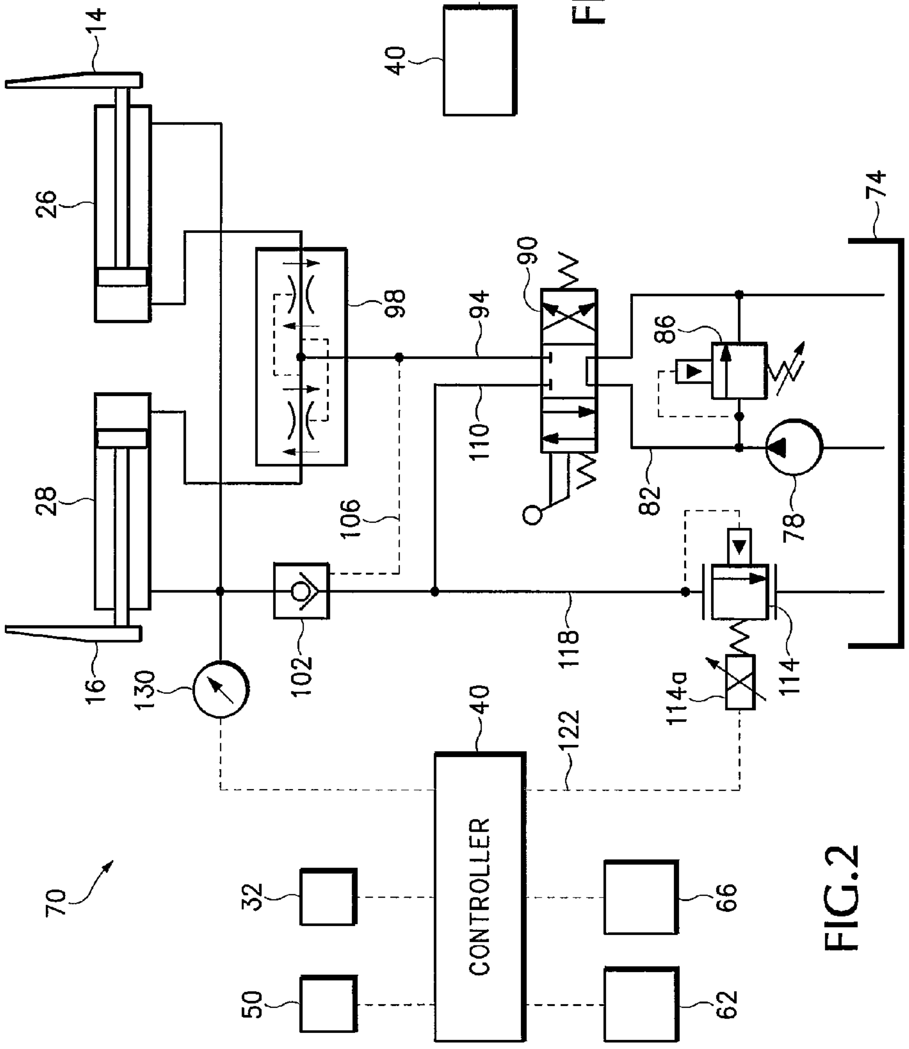
FIG. 2 is a hydraulic and electrical schematic illustrating an exemplary embodiment of the present control system.

Referring to FIG. 2, the electronic code reader 32 transmits the information read from a coded label 34 to a controller 40. The controller 40 parses the information to identify the LOAD ID or other identifying indicia. This is accomplished in whatever manner is required by the particular implementation of the particular embodiment of the present system being used.

Still referring to FIG. 2 and also to FIGS. 3A-3D, when the clamp arms 14, 16 are in an open position the arms partially define a three dimensional clamping region indicated generally by 44. In order to clamp a load 12, the clamp operator positions the clamp arms 14, 16 such that the load is disposed in the clamping region 44. Load geometry sensors 50 are in data communication with the controller 40 and are disposed at the periphery of the clamping region 44. In the illustrated embodiment, the load geometry sensors 50 are advantageously arranged on respective load-engaging surfaces 20, 22. The load geometry sensors 50 are oriented inwardly, generally in the direction of the opposing surface 22, 20.

Each load geometry sensor 50 absorbs stimuli from its surrounding environment and dynamically modulates a characteristic of the communication medium between it and the controller 40 as a function of the absorbed stimuli. In certain embodiments of the present system, the sensors 50 may for example be infrared-beam sensors, such as the GP2XX family of IR Beam Sensors, commercially available from Sharp Corporation.

An example of such a sensor includes an emitter component, a detector component, an analog output and internal circuitry. The sensor emits a beam of infrared (IR) light. The beam of IR light travels through the clamping region until it encounters an obstruction, e.g. an interfering surface of a load or, in the absence of a load, the opposing load engaging surface. Preferably, but not essentially, the interfering surface is approximal and parallel to the load engaging surface and the beam is emitted in a plane perpendicular to the load engaging surface. The beam of IR light is reflected off the surface and is at least partially absorbed by the detector component. Within the sensor, the internal circuitry measures the angle between the sensor and the absorbed IR light and, via trigonometric operations, uses the angle to further calculate the distance between the sensor and the interfering surface and expresses the distance as an analog voltage. The sensor communicates the calculated distance information to the controller 40 via the analog output.

In alternative embodiments of the present system, intermediate circuitry (not shown) may be placed between the sensor 50 and the controller 40. For example, it may be impractical to use a controller having sufficient data inputs to directly connect to each sensor 50. Thus, each load geometry sensor 50 may be directly connected to a converter circuit (not shown) and the circuit may be further connected to synchronized multiplexing circuitry (not shown) which, in turn, is connected to a data input of the controller 40. Utilizing known techniques, the data from all the load geometry sensors 50 may be combined and provided to the controller 40 through a single data input while still being suitable for use in the present system.

Figure 3A:
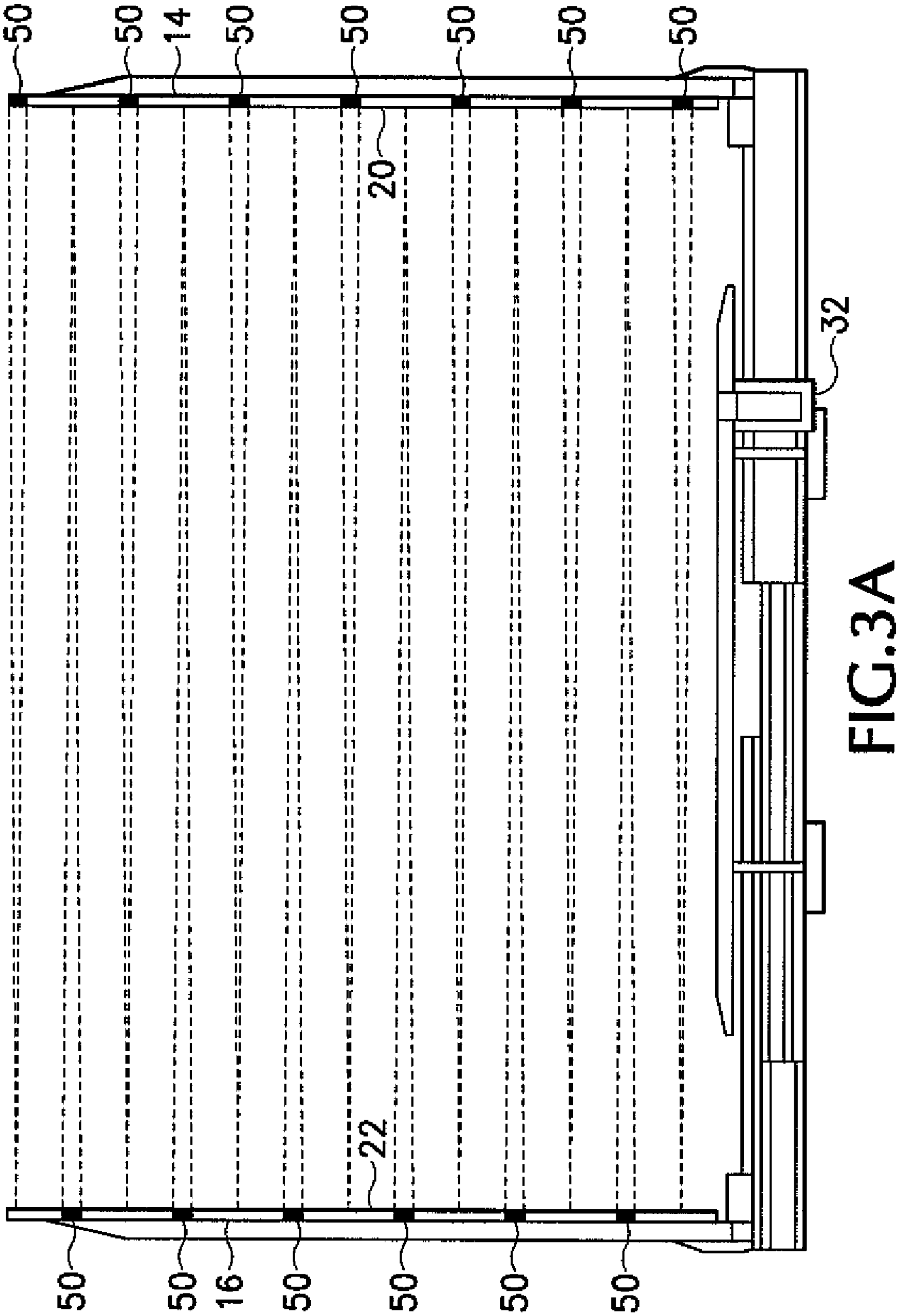
FIG. 3A illustrates a plan view of the clamp shown in FIG. 1A.
Figure 3B:
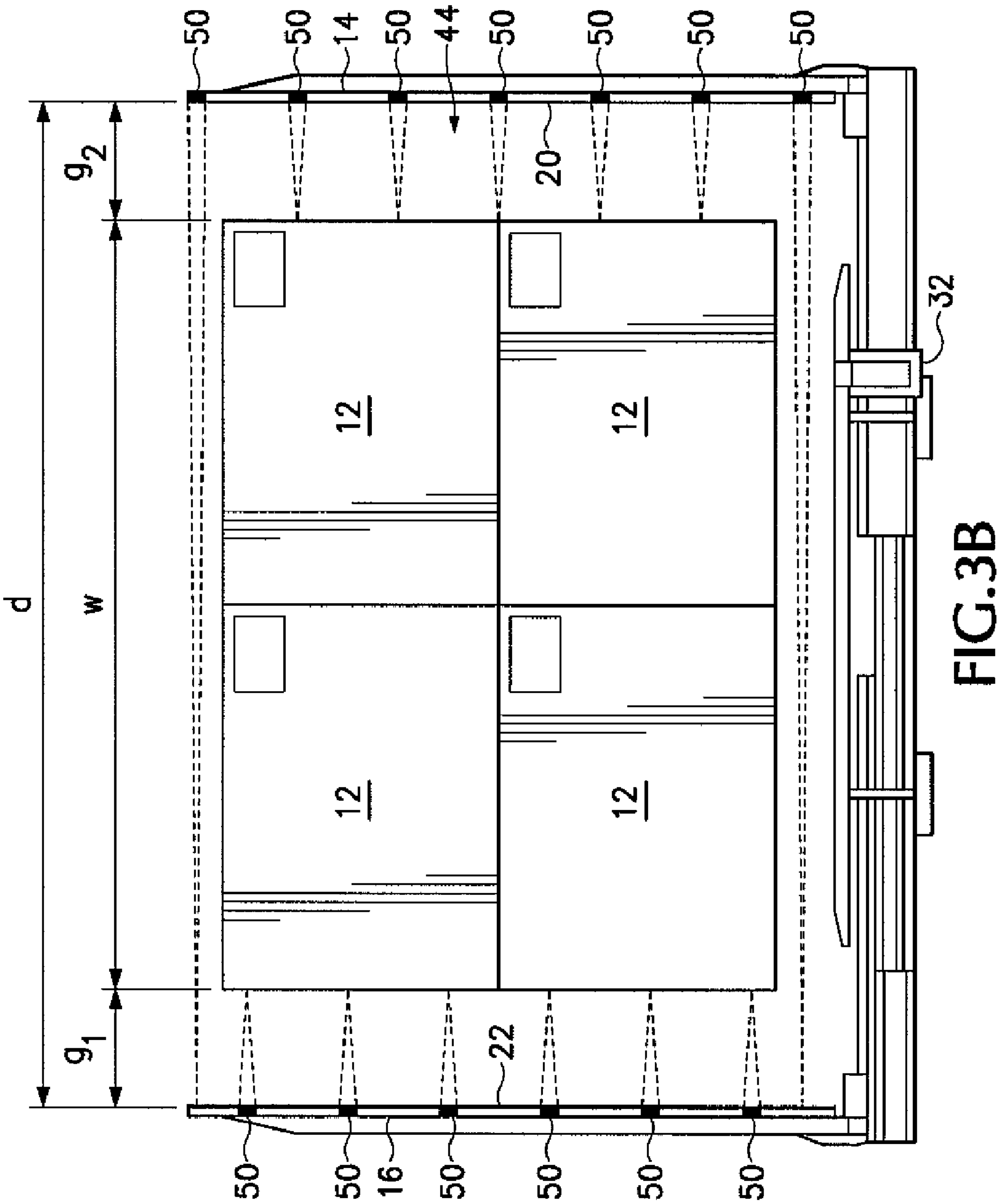
FIG. 3B illustrates a plan view of the clamp shown in FIG. 3A with a load disposed between the clamp arms.
Figure 3C:
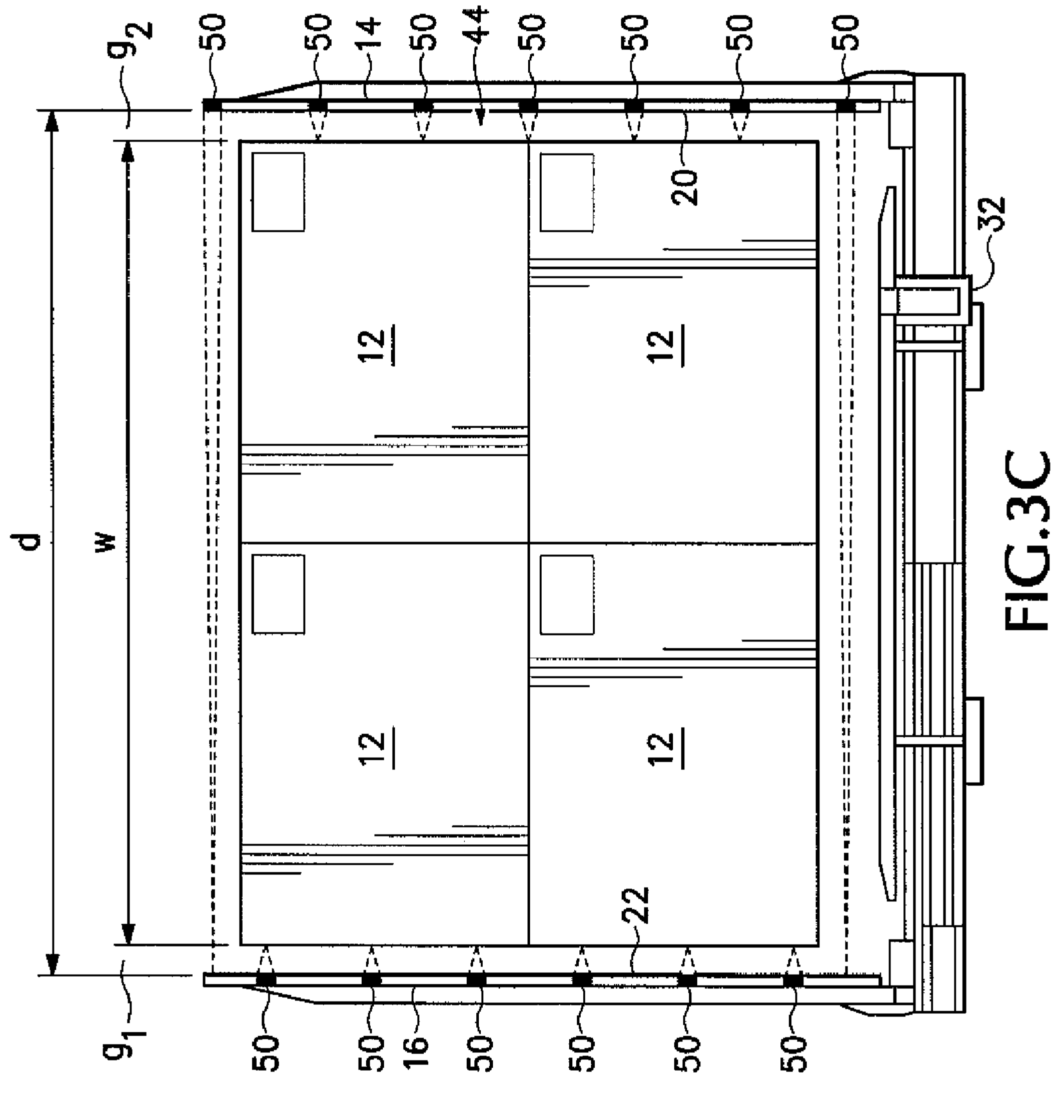
FIG. 3C illustrates a plan view of the clamp shown in FIG. 3A with a load disposed between the clamp arms.
Figure 3D:
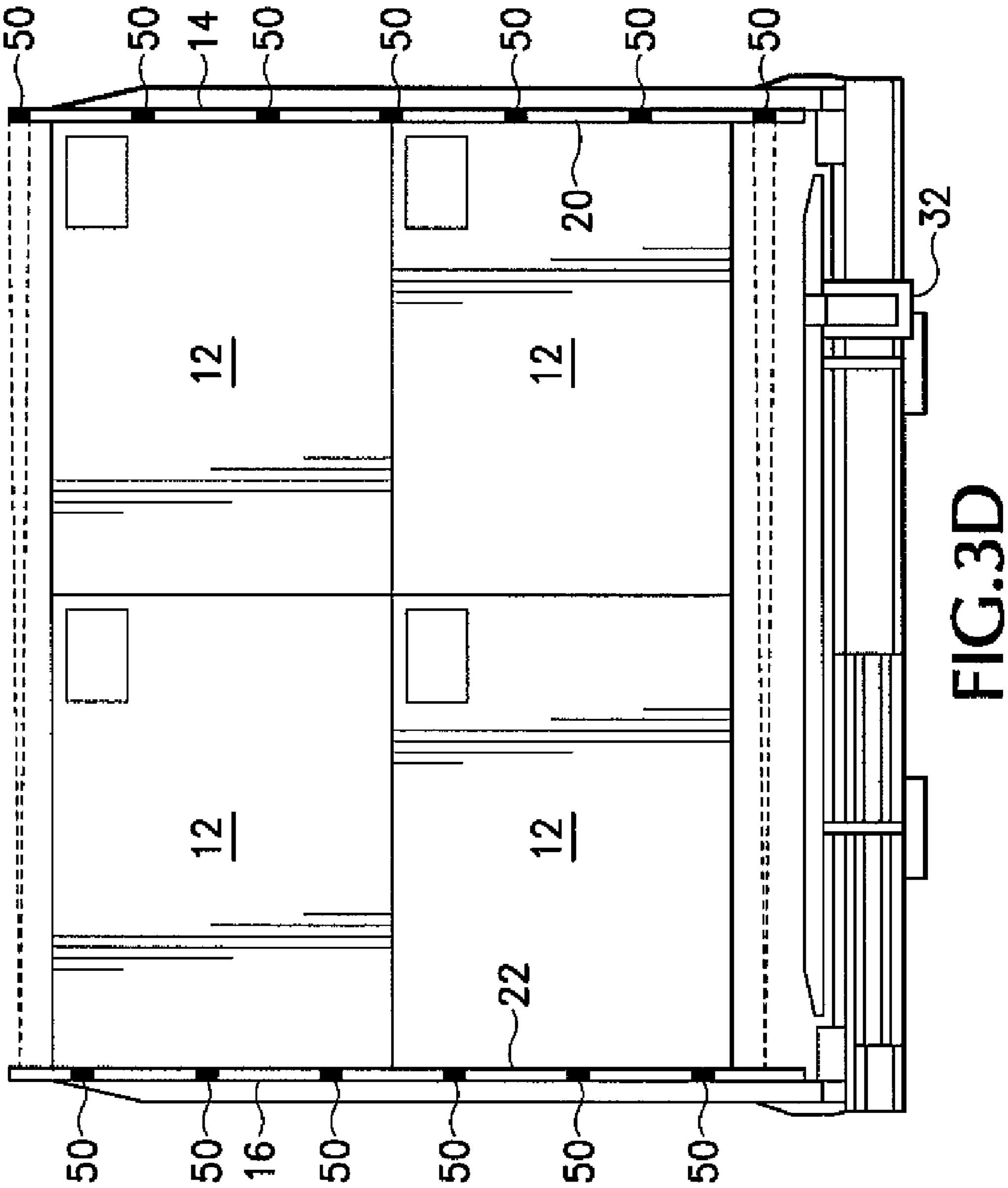
FIG. 3D illustrates a plan view of the clamp shown in FIG. 3A with a load gripped by the clamp arms.

Referring further to FIG. 1A, in the illustrated exemplary embodiment, the sensors 50 maybe arranged in grid arrays 53, 54 having rows 56 and columns 58, the first array 53 being offset from the second array 54. As shown in FIG. 3A, when the space between the clamp arms is unoccupied, the stimulus output by all sensors will be commensurate with the distance d between the clamp arms. As shown in FIG. 3B, the signal from at least one of the load geometry sensors 50 will change when a load 12 is interposed between the clamp arms 14, 16. The controller 40 may then calculate the load's approximate volume. The number of rows 56 and columns 58 of load geometry sensors whose signal indicates the presence of the load respectively correspond to the load's height and depth and the magnitude of the change in the signal from the obstructed sensors, relative to the signal generated while the sensors are unobstructed, corresponds to the load's width: $d-g_1-g_2=w$. Alternatively the sensors 50 may be arranged in any other suitable type of array.

At least one of the load geometry sensors 50 may also function as a load proximity sensor. As is described hereafter, during a clamping operation the present system advantageously adjusts the maximum hydraulic clamping pressure as a function of the distance between the clamp arms and the load, such that a desired clamping pressure is reached at a desired distance.

Other embodiments of the present system (not shown), such as an embodiment intended for use with a hydraulically operated pivoted-arm clamp for clamping cylindrical objects, may utilize different sensor arrangements for measuring the load geometry. For example, the diameter and height of a cylindrical load could be determined in the same manner described above. By way of non-limiting example, the diameter of a cylindrical load (not shown) could alternatively be determined by measuring the stroke of a hydraulic cylinder (not shown) as the clamp arm contacts the load, but prior to clamping the load, using a string potentiometer (not shown) or an etched rod and optical encoder (not shown) in combination with other sensors.

Alternatively to the use of coded labels 34, or in combination therewith, the controller 40 may be in electronic communication with machine readable electronic memory 62 and/or with external information sources (not shown), such as the facility's central management system or other load handling clamps operating in the same facility, via a data receiver, such as a wireless network interface 66. The wireless network interface 66 may frequently be advantageous because it allows for dynamic data communication with the external sources while the clamp is operating. Alternative types of data receivers may be used in addition to or in place of the wireless network interface 66, such as an Ethernet network interface card, a universal serial bus port, an optical disk drive, or a keyboard.

In the exemplary embodiment of the present system, memory 62 contains information corresponding to the preferred operation of the clamp when gripping and lifting various toad types and geometric configurations thereof, preferably arranged in look-up tables organized by load category and load geometry. The information may be an assigned indicia, herein referred to as a LOAD ID, or a physical load attribute or characteristic, preferably one closely correlated with an optimal maximum clamping force, or optimal maximum hydraulic clamping pressure, such as load weight, load fragility, load packaging, etc. For each load category, the data is preferably further categorized according to the potential geometric configurations of the detected load category.

Alternatively, the data may be statically stored outside of the embodiment of the present system, such as in the facility's central management system or an offsite database, and made accessible to the controller over an internal and/or external network or networks via the data receiver. Upon determining the relevant load characteristics, e.g. the load category and geometric configuration, the controller may copy the necessary data from the external source into memory 62.

The data in memory 62 may be specific to the types of loads and load geometries the clamp may encounter at the facility in which it operates. The data may be updated via the data receiver as necessary; for example when new categories of loads are introduced to the facility or when an aspect of the current data is deemed to be insufficient or inaccurate. Additionally, the controller 40 may selectively self-update the data as explained in more detail hereafter.

As described above, the present system may obtain a LOAD ID, or other identifying indicia, for the load 12 to be clamped by reading a coded label 34 on the load. Alternatively, such LOAD ID or other identifying information can be obtained by other types of data receivers directly from the facility's central management system or from other load handling clamps via a wireless network interface. As also described above, the present system uses the load geometry sensors to calculate an approximate volume of the load. Both items of information are advantageously determined before the clamp arms clamp the load and with no input required from the clamp operator. The controller 40 looks up the optimal maximum hydraulic clamping pressure for the determined LOAD ID and load geometric profile. This optimal maximum pressure is then applied to the load during the clamping operation as described hereafter.

Referring to FIG. 2, hydraulic clamping cylinders 26, 28 are controlled through hydraulic circuitry, indicated generally as 70 in simplified schematic form. The hydraulic clamping cylinders 26, 28 receive pressurized hydraulic fluid from the lift truck's reservoir 74 through a pump 78 and supply conduit 82. Safety relief valve 86 opens to shunt fluid back to the reservoir 74 if excessive pressure develops in the system. The flow in conduit 82 supplies manually actuated clamp control valve 90, as well as manually operated valves such as those controlling lift, tilt, side-shift, etc. (not shown), which may be arranged in series with valve 90. The clamp control valve 90 is controlled selectively by the operator to cause the cylinders 26, 28 either to open the clamp arms or to close the clamp arms into initial contact with the load 12.

To open the clamp arms 14, 16, the schematically illustrated spool of the valve 90 is moved to the left in FIG. 2 so that pressurized fluid from line 82 is conducted through line 94 and flow divider/combiner 98 to the piston ends of cylinders 26, 28, thereby extending the cylinders 32 at a substantially equal rate due to the equal flow-delivering operation of the divider/combiner 98, and moving the clamp arms 14, 16 away from each other. Pilot-operated check valve 102 is opened by the clamp-opening pressure in line 94 communicated through pilot lines 106, enabling fluid to be exhausted from the rod ends of cylinders 26, 28 through line 110 and valve 90 to the reservoir 74 as the cylinders 26, 28 extend.

Alternatively, to close the clamp arms and clamp the load 12, the spool of the valve 90 is moved to the right in FIG. 2 so that pressurized fluid from line 82 is conducted through line 110 to the rod ends of cylinders 26, 28, thereby retracting the cylinders and moving the clamp arms 14, 16 toward each other. Fluid is exhausted at substantially equal rates from the piston ends of the cylinders 26, 28 to the reservoir 74 through the flow-divider/combiner 98, and then through line 94 via the valve 90. During closure of the clamp arms 14, 16 by retraction of the cylinders 26, 28, the maximum hydraulic dosing pressure in the line 110 is preferably controlled by one or more pressure regulation valves. For example, such a pressure regulating valve can be a proportional relief valve 114 in line 118 in parallel with line 110, such maximum hydraulic closing pressure corresponding to different settings automatically selectable in a substantially infinitely variable manner by controller 40 via control line 122, which electronically adjusts the relief pressure setting of valve 114 by variably controlling a solenoid 114*a* of the valve. Alternatively, a proportional pressure reducing valve 126 (FIG. 2A) could be interposed in series in line 110 to regulate the maximum hydraulic closing pressure in line 110. As further alternatives, selectable multiple non-proportional pressure relief or pressure reducing valves can be used for this purpose. If desired, the controller 40 could also receive feedback of the clamp force through hydraulic closing pressure from optional pressure sensor 130 to aid its control of the foregoing pressure regulation valves. Such feed back could alternatively be provided from a suitably mounted clamp force-measuring electrical transducer (not shown).

Various aspects of the clamp's behavior are selectively regulated by the controller 40 in view of the clamping requirements of the load being presented to the clamp. As the clamp arms close towards the load, the controller 40 operates in accordance with the steps of FIGS. 4A and 4B. Appropriate portions of these figures will be referenced in the following operational description of the clamp.

Figure 4A:
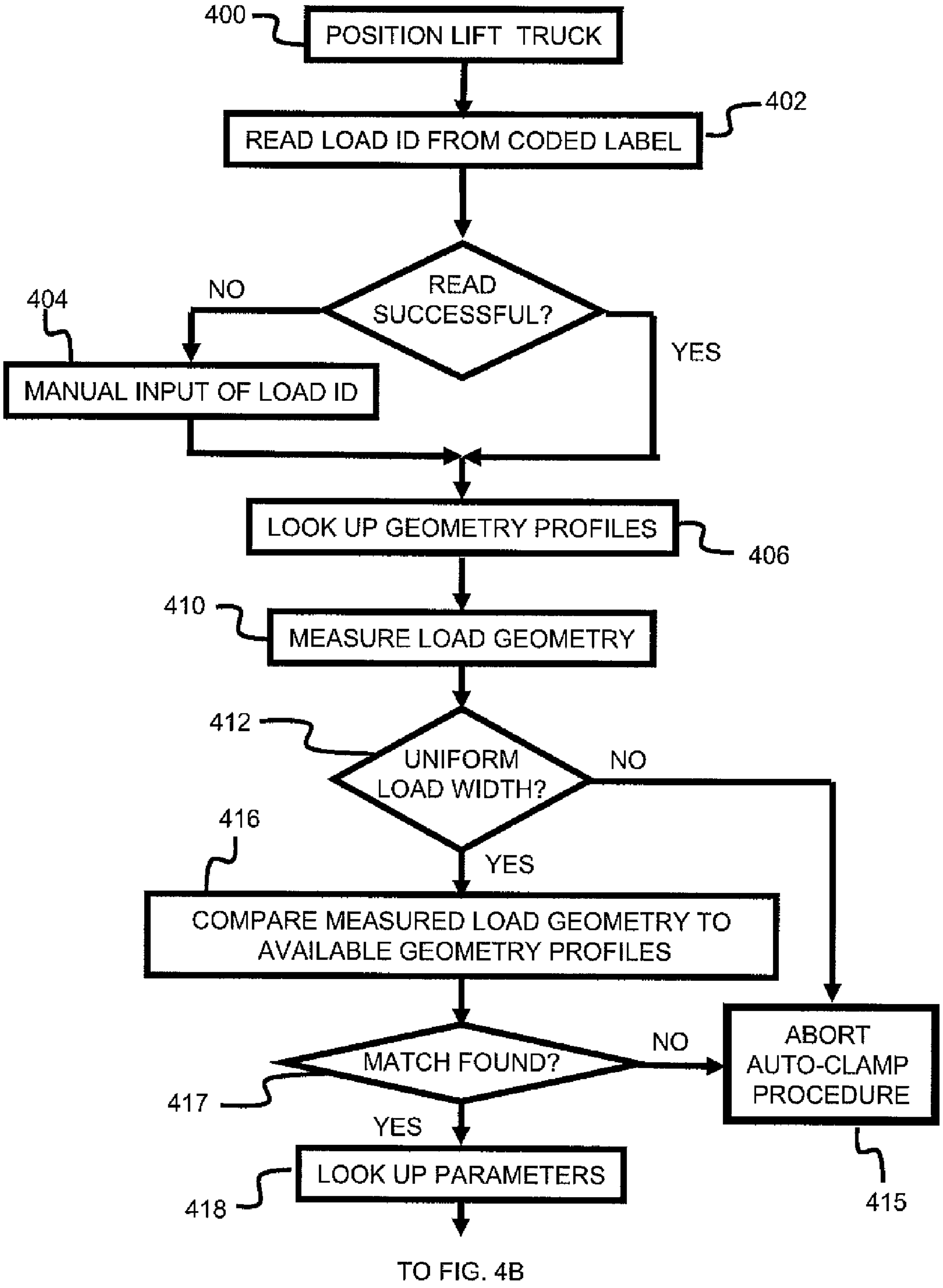
FIG. 4A is a flow chart showing the first section of the control logic for an exemplary embodiment of the present control system.

At step 400 of FIG. 4A, the lift truck operator maneuvers the lift truck with open clamp arms such that a load 12 is interposed between the load engaging surfaces, as shown in FIG. 3B. The system then attempts to read the load's LOAD ID at step 402, for example in the manner described above utilizing the code reader 32 and coded label 34. If the system is unable to determine the LOAD ID, the clamp operator may enter it manually at step 404, or the operator can actuate a switch (not shown) enabling control of the clamp manually in a non-automatic mode.

After reading the LOAD ID in step 402, the controller looks up the available Load Geometry Profiles at step 406 and measures the load geometry using the data received from the load geometry sensors 50 at step 410. For safety, the controller may also check to ensure the load has a uniform width at step 412. If the width is nonuniformed, the Auto-clamp procedure may be aborted at step 415, in which case the operator can likewise choose to control the clamp manually in its non-automatic mode by activating a switch (not shown). If the width of the load is uniform, the controller continues and compares the measured load geometry to the available profiles at step 416. The controller then selects the best match at step 417, if possible. However, if none of the available geometry profiles corresponds to the sensed load geometry measured by the sensors 50 and compared at step 416, the controller can halt the automatic clamping operation at step 415, in which case the operator can likewise choose either from one of a set of predetermined load geometry configurations or to control the clamp manually in its non-automatic mode. Although the measuring step of 410 is illustrated as occurring after the look-up step of 406, the two steps may be performed in the reverse order or in parallel.

If no error is registered at step 412, the controller loads the optimal hydraulic clamping pressure and other parameters for the selected load geometry profile into the controller's local memory at step 418. The controller 40 then initiates the clamping operation at step 420 (FIG. 4B).

Figure 4B:
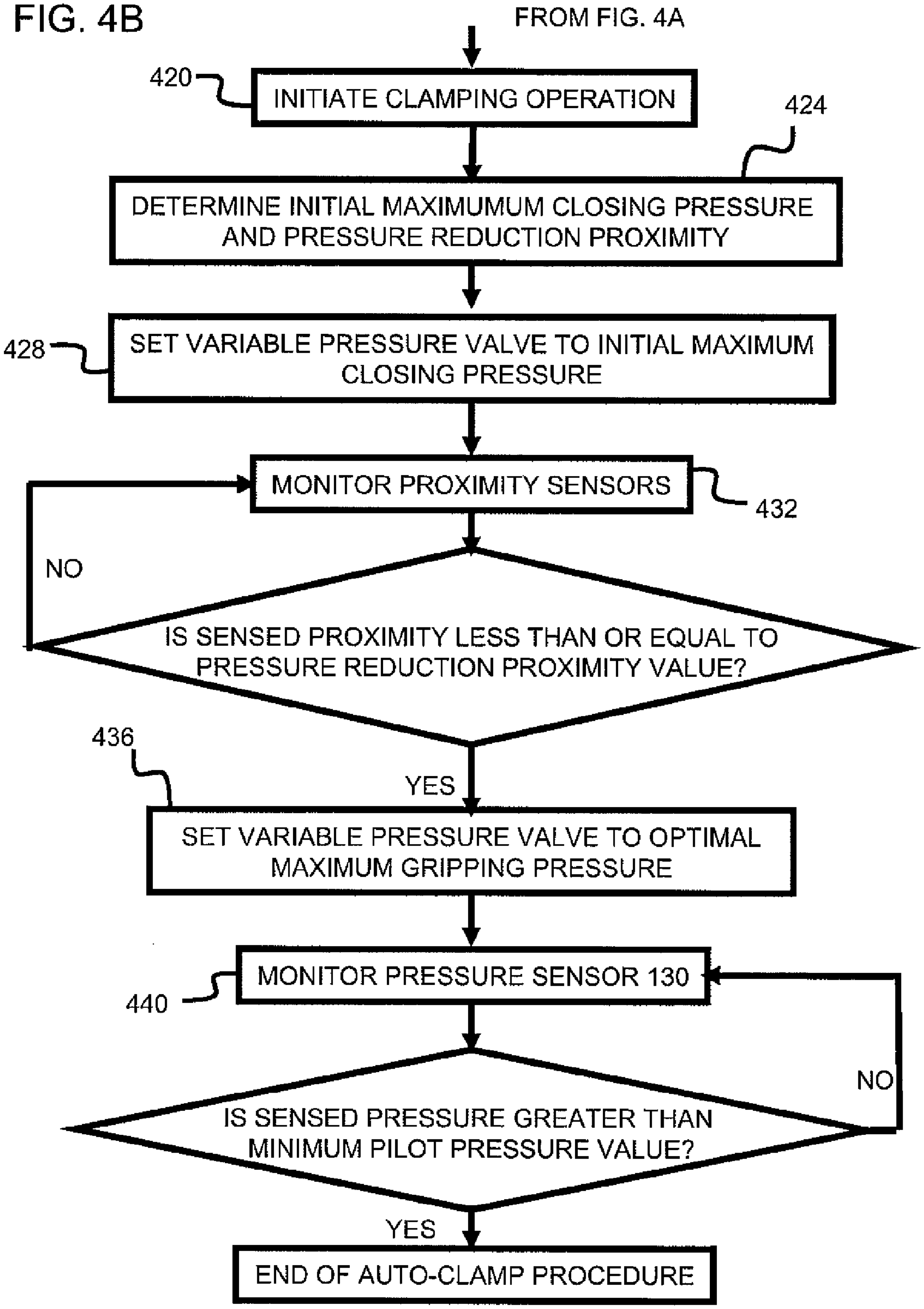
FIG. 4B is a flow chart showing the second section of the control logic for an exemplary embodiment of the present control system.

Referring to FIG. 4B, at step 424, the controller determines at least a relatively high initial maximum hydraulic closing pressure level and a pressure reduction proximity. Alternatively, the initial maximum hydraulic closing pressure and pressure reduction proximity for each potential load configuration may be pre-calculated, stored in the controller's look-up tables, and accessed at step 420. The high initial maximum hydraulic closing pressure level enables the high-speed closure of the clamp arms toward the load prior to actually gripping the load and, in many cases, will be the maximum hydraulic pressure the clamp is capable of applying in a closing operation. The pressure reduction proximity determines the point at which the initial maximum hydraulic closing pressure should be reduced by the pressure regulating valve 114 (or 126) to provide the optimal maximum hydraulic clamping pressure, as near as possible to contacting the load.

At step 428, the controller 40 sets the variable pressure regulating valve 114 (or 126) to the relatively high initial maximum hydraulic closing pressure. In the illustrated embodiment, the load geometry sensors 50 also act as load proximity sensors. As the arms close, at step 432 the controller 40 monitors load proximity sensors 50 on the clamp arms 14, 16 and compares the measured distance between the clamp arms and the load to the pressure reduction proximity. When the distance crosses the proximity threshold, controller 40 reduces the pressure setting of the pressure regulating valve to a level selected to decrease the maximum hydraulic pressure from the high-speed initial closing pressure to the optimal maximum hydraulic clamping pressure as the clamp arms close the remaining distance on the load, at step 436.

At step 440, as the load-engaging surfaces of-the clamp arms clamp the load, the clamp-closing pressure in line 110 can, if desired, be sensed by the optional pressure sensor 130. After the optimal maximum hydraulic clamping pressure is established at step 436, the operator moves the valve 90 to its centered, unactuated position and begins to lift the load 12 for transport.

The controller may thereafter optionally detect errors in the above clamping process, and/or unintended changes in hydraulic clamping pressure, during transport of the load by monitoring the optimal hydraulic clamping pressure sensor 130. For example, if the load slips or is over-clamped, or the actual load weight differs substantially from the predicted load weight, this could indicate an error in either the load geometry measurement, the selection of the load geometry profile based on the measurement, or in the predicted load weight stored in the look-up table. The controller may advantageously record these errors and, if necessary, update its look-up tables and/or report the errors to the central management system for further analysis.

In a warehouse with multiple lift trucks equipped with embodiments of the present clamp, comparing reported error messages between the various clamps contributes to finding the source of the errors. If multiple clamps report a similar error with the same LOAD ID and load geometry profile combination, the data in said profile may be inaccurate. On the other hand, if one clamp repeatedly experiences a particular error whereas other clamps do not, this indicates a mechanical problem with the clamp. This analysis could be performed manually, automatically by a central warehouse management software system, or by the controllers of the lift trucks in wireless communication with one another using a distributed computing model.

The present system may be readily adapted for use with non-hydraulically powered clamp. For example, a electric motor powered screw actuator and a rotary electric motor torque controller could replace the hydraulic actuator and pressure control valves respectively without departing from the scope of the present system.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A control system comprising:

(a) a controller for a load-handling clamp having first and second load-engaging surfaces for selectively gripping respective dissimilar units of multiple loads between said surfaces, at least one of said surfaces being selectively movable toward the other by a clamping actuator;

(b) said controller being capable of variably regulating a clamping force setting causing said actuator to move said one of said surfaces toward the other in a load gripping movement;

(c) said controller being operable to receive information variably describing a respective geometric configuration and a respective load-type identifier applicable to each of said dissimilar units of said multiple loads, said controller further being operable to automatically select a respective different optimal clamping force setting for each of said dissimilar units from predetermined multiple different optimal clamping force settings depending upon both said respective geometric configuration and said respective load-type identifier in combination.

2. The control system of claim 1 wherein said controller is further operable to select said respective geometric configuration from predetermined multiple different geometric configurations.

3. The control system of claim 1 wherein said controller is operable to identify an error in said optimal clamping force setting.

* * * * *

UNITED STATES PATENT AND TRADEMARK OFFICE

CERTIFICATE OF CORRECTION

PATENT NO. : 8,078,315 B2
APPLICATION NO. : 12/117648
DATED : December 13, 2011
INVENTOR(S) : Pat S. McKernan et al.

It is certified that error appears in the above-identified patent and that said Letters Patent is hereby corrected as shown below:

Col. 4, Line 56

Change “toad” to read --load--.

Col. 5, Line 66

Change “dosing” to read --closing--.

Signed and Sealed this
Sixth Day of March, 2012

David J. Kappos
*Director of the United States Patent and Trademark Office*